United States Patent [19]

Black

[11] Patent Number: 5,151,600

[45] Date of Patent: Sep. 29, 1992

[54] NOSESHADE FOR MONITORING EXPOSURE TO ULTRAVIOLET RADIATION

[75] Inventor: Michael Black, Foster City, Calif.

[73] Assignee: Reliant Laser Corporation, Foster City, Calif.

[21] Appl. No.: 867,433

[22] Filed: Apr. 13, 1992

[51] Int. Cl.⁵ .............................................. G02C 11/00
[52] U.S. Cl. ................................. 250/372; 351/158; 351/41
[58] Field of Search ................ 250/372; 351/87, 88, 351/158, 41

[56] References Cited

U.S. PATENT DOCUMENTS

| | | | |
|---|---|---|---|
| 3,597,054 | 8/1971 | Winter | 351/48 |
| 4,851,685 | 7/1989 | Dübgen | 250/372 |
| 4,851,686 | 7/1989 | Pearson | 250/372 |
| 5,008,548 | 4/1991 | Gat | 250/372 |
| 5,045,700 | 9/1991 | Crowson et al. | 250/336.1 |
| 5,107,123 | 4/1992 | Shi | 250/372 |
| 5,114,218 | 5/1992 | Black et al. | 351/158 |

*Primary Examiner*—Carolyn E. Fields
*Assistant Examiner*—Drew A. Dunn

[57] ABSTRACT

A noseshade for monitoring exposure to UV radiation comprises a contoured portion (100) having a clip (102) for attachment to a pair of glasses. The contoured portion of the noseshade incorporates a digital LCD (104), an information-display key (106), and input keys (108 and 110). A UV-enhanced photovoltaic photodetector (122) having a built-in amplifier (124) is mounted into the contoured portion of the noseshade, which also houses solar cells (112 and 114) and a microcontroller (118). The inner portion of the clip contains a pressure-sensitive switch (107) for activation of the solar cells.

18 Claims, 3 Drawing Sheets

NOSESHADE FOR MONITORING EXPOSURE TO ULTRAVIOLET RADIATION

BACKGROUND

1. Field of the Invention

The present invention relates to devices for detecting radiation, particularly to devices for determining skin-damaging levels of ultraviolet (UV) radiation.

2. Description of Prior Art

Solar radiation reaching the earth consists of electromagnetic energy ranging from ultraviolet (UV) light to infrared (IR) light. UV radiation is further subdivided into three types: UV-A, UV-B, and UV-C. UV-C radiation has wavelengths in the range of 200 to 285 nanometers (nm) and is totally absorbed by the earth's atmosphere. UV-B, from about 285 to 318 nm, is known to cause skin cancer in humans. UV-A, from about 315 to 400 nm, is mostly responsible for tanning. However, UV-A has also been found to play some role in skin cancer and is the cause of eye cataracts, solar retinitis, and corneal dystrophies.

Based on general principles and techniques for radiometry and photometry, several UV radiation-measuring and warning instruments have been developed and made commercially available.

A personal UV radiometer, described in U.S. Pat. No. 5,008,548 to Nahum Gat, 1991, includes an LCD display, a photocell, and an integrated circuit for processing user inputs and UV radiation data.

However, this radiometer is unable to correctly monitor levels of UV radiation when it is not directly exposed to solar rays, i.e., when it is placed in the shade. Moreover, the device does not take into account the changes in skin pigmentation which occur while a person is being exposed to solar radiation. Furthermore, this device is not maximally convenient, since it is intended for attachment to an article of clothing and may restrict movement of a person during rigorous physical activity, for instance, a volleyball game.

An apparatus, disclosed in U.S. Pat. No. 4,985,632 to Frank Bianco et al., 1991, comprises an electronic wristwatch having a digital readout for displaying the time, the day, and the month. It also incorporates a photodiode for detecting skin-damaging UV radiation, a microcomputer, and four function buttons.

This device, however, is not user-friendly due to its large number of functions, many of which are superfluous. Moreover, like the radiometer, the wristwatch does not take into account skin pigmentation changes which occur during exposure to UV radiation. Furthermore, it can not monitor UV radiation when placed in the shade.

All of the above the prior-art devices are based on the assumption that the amount of UV radiation that may be safely tolerated by human skin is independent of the intensity of incident radiation and is determined only by the total accumulated energy. Even though some prior-art devices directly measure the intensity level of incident radiation, this measurement is not factored into the calculation of a safe UV-energy threshold.

In other words, none of the prior-art devices are able to predict the effects of a given radiation dose received at different rates by a subject's skin. As illustrated in FIGS. 1A and 1B, total accumulated energy quantities $E_1$ and $E_2$ are represented as areas under intensity versus time curves and are numerically equal. However, a subject who absorbs energy quantity $E_2$ is much more likely to suffer from harmful effects of UV radiation (sunburn, eye irritation, etc.) than a subject who receives energy quantity $E_1$, since energy quantity $E_2$ is more intense and has been absorbed over a much shorter period.

OBJECTS AND ADVANTAGES

It is accordingly an object of the invention to provide an improved device for monitors exposure to UV radiation which continues to monitor UV radiation when placed in the shade, which takes into account the changes in skin pigmentation that occur during exposure to UV radiation, and which determines the acceptable UV radiation dose based on the intensity of incident radiation.

Still another object is to provide a device which protects the nose from sunburn, which is simple and convenient in operation, and which is reliable and inexpensive.

Further advantages will become apparent from a consideration of the ensuing description and drawings.

DRAWING FIGURES

Figure 1:
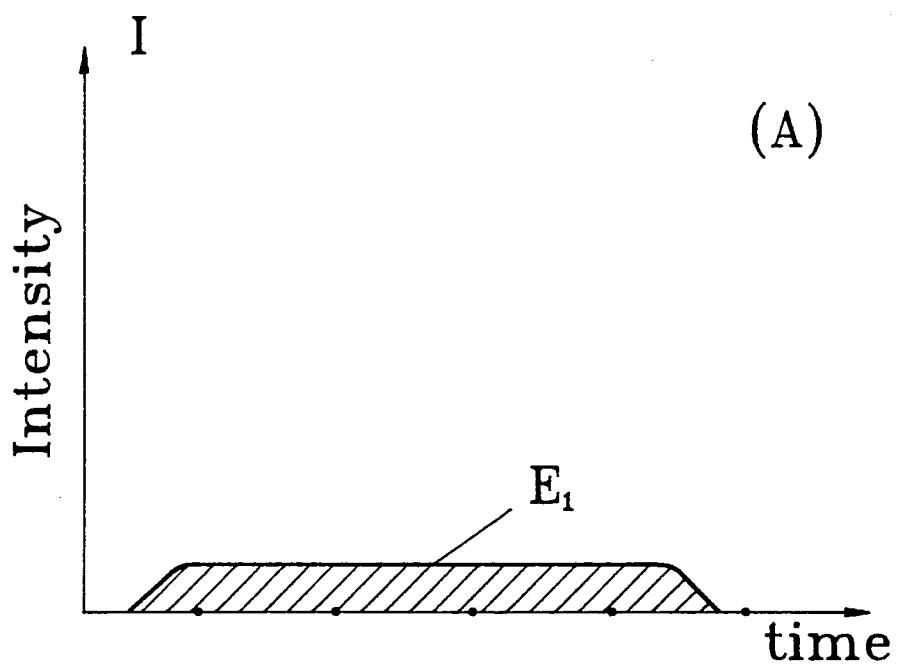
FIGS. 1A and 1B are plots of solar UV radiation intensity versus time.
Figure 1:
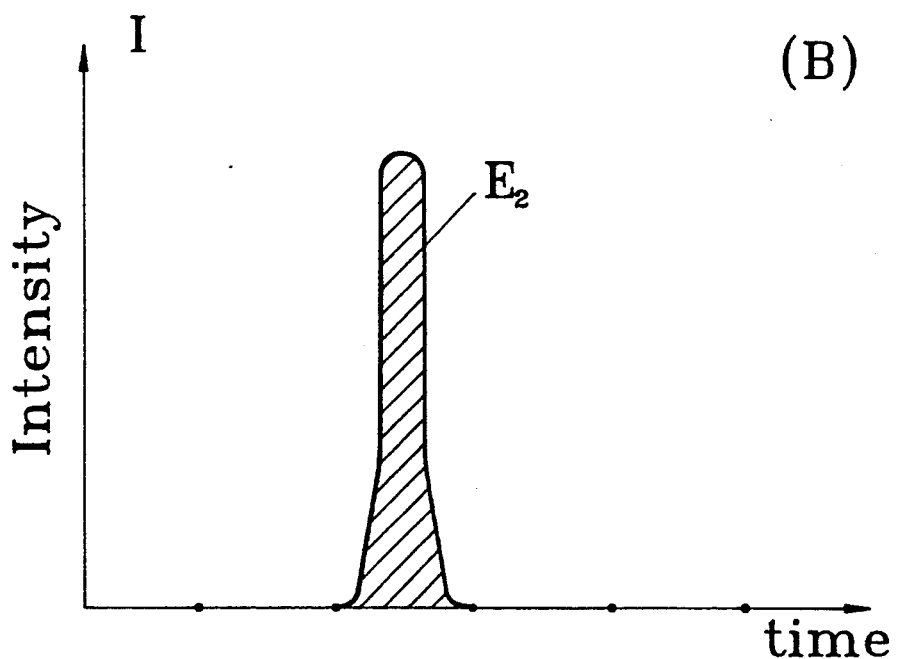

REFERENCES NUMERALS USED IN THE DRAWINGS AND DESCRIPTION $E_1$, $E_2$ - energy quantities
100 - contoured nose-covering portion
102 - clip
104 - digital liquid-crystal display
106 - information-display key
107 - activation switch
108 - skin-type input key
110 - skin protection factor input key
112, 114 - solar cells
116 - photodetector assembly
118 - microcontroller
120 - circuit conductors
122 - UV-enhanced dual photovoltaic photodetector
124 - operative amplifier
126-A, 126-B - optical band-pass filters
128 - CPU
130 - driver unit
132 - memory
134 - RAM
136 - ROM
138 - clock
140 - piezoelectric element

FIGS. 2

DESCRIPTION OF NOSESHADE

Figure 2:
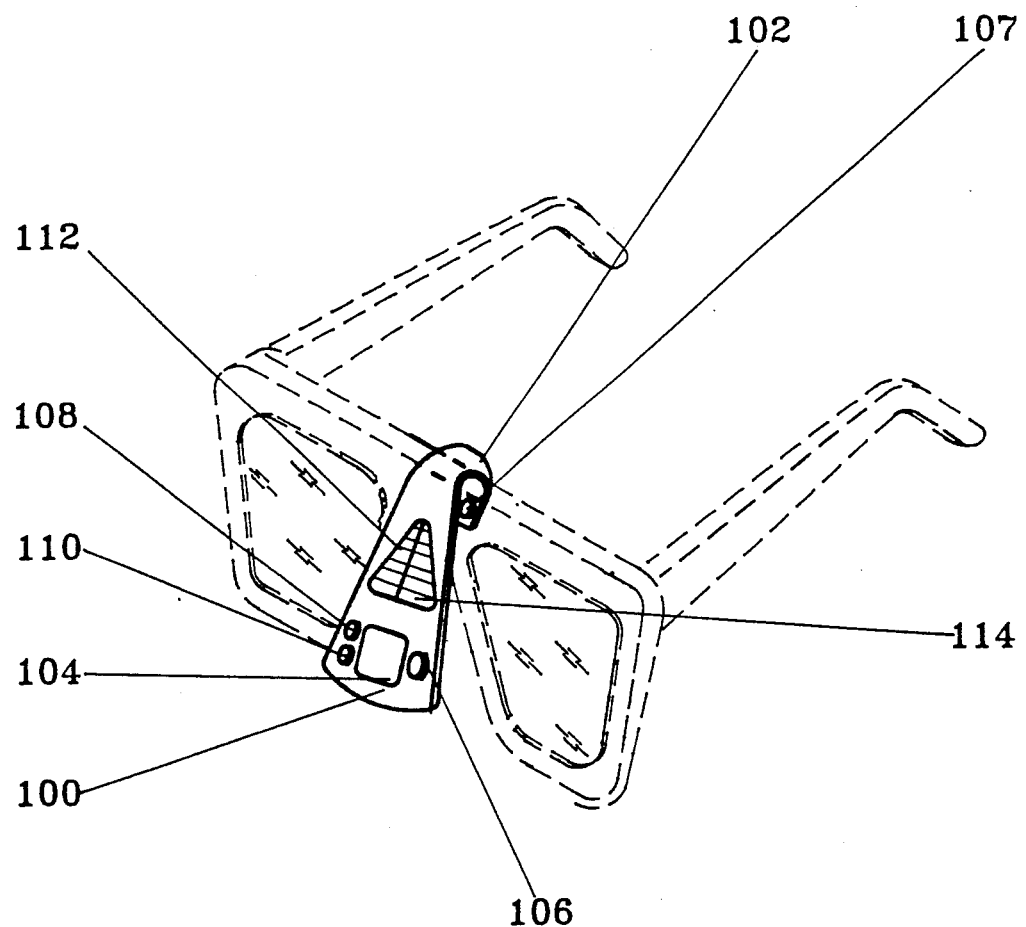
FIG. 2 is a perspective view of an apparatus according to the invention.

A perspective view of a noseshade for monitoring UV radiation according to the invention is shown in FIG. 2.

The noseshade includes a radiation sensor coupled with a logic circuit and comprises a contoured nose-covering portion 100 and a clip 102. Portion 100 incorporates a digital liquid-crystal display (LCD) 104, a display key 106, and input keys 108 and 110. Clip 102 contains a pressure-sensitive activation switch 107. LCD 110 is able to display the amount of time remaining until predetermined UV radiation thresholds corresponding to UV intensity and to a total accumulated energy level are exceeded. When input keys 108 and 110 are activated, LCD 110 also displays the user's skin type and skin protection factor.

Portion 100 also houses solar cells 112 and 114, a photodetector assembly 116, and a microcontroller 118. The solar cells are intended for outdoor use only and are not suitable for use with artificial light.

Circuit conductors 120 electronically connect display 104, keys 106, 108, and 110, photodetector assembly 116, solar cells 112 and 114, activation switch 107, and microcontroller 118.

FIG. 3

DESCRIPTION OF CIRCUIT

Figure 3:
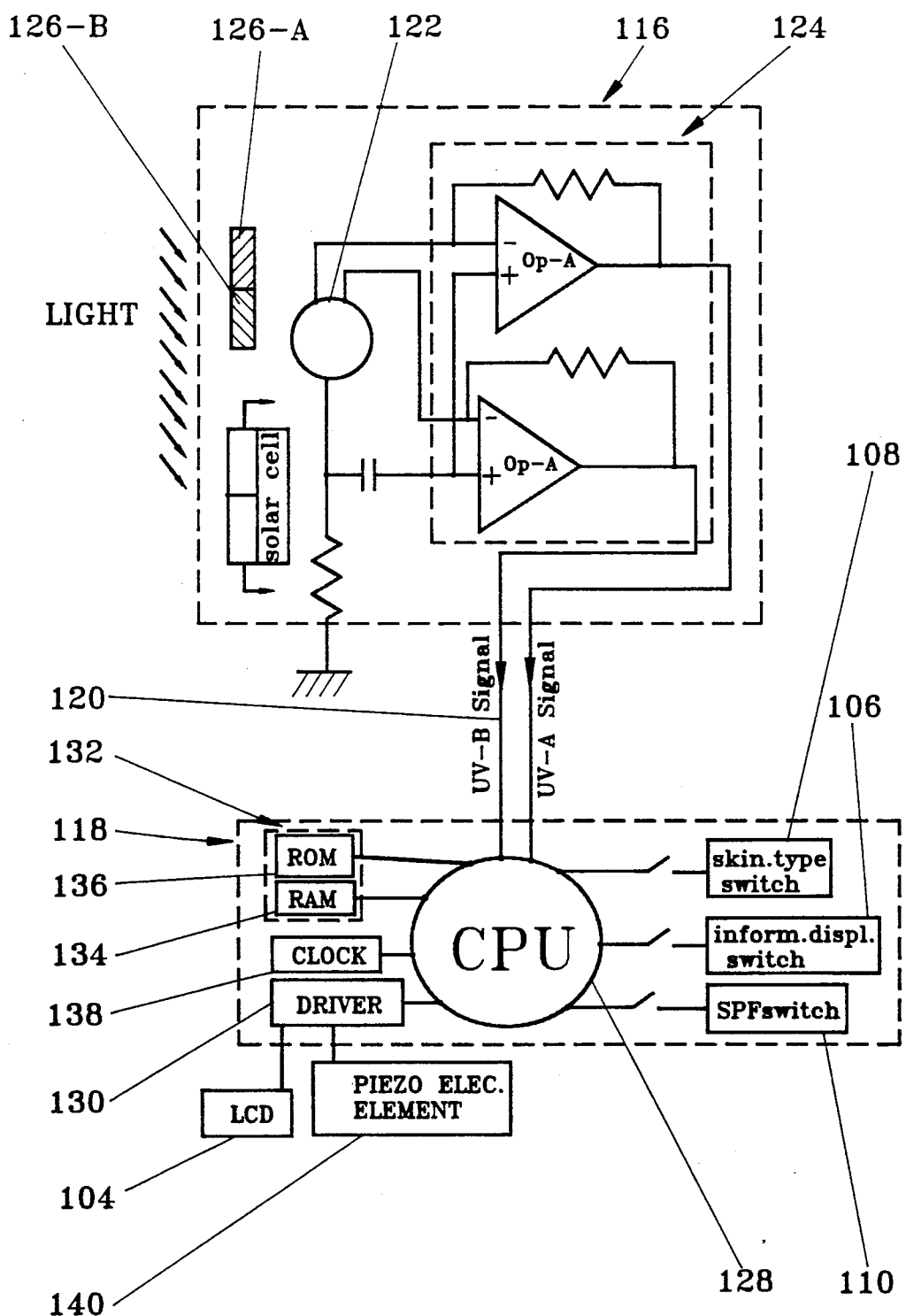
FIG. 3 is a block diagram of electrical circuits and elements included in the apparatus of FIG. 2.

A block diagram of the circuit of the noseshade for monitoring exposure to UV radiation is shown in FIG. 3.

Photodetector assembly 116 comprises an integral unit incorporating a UV-enhanced dual photovoltaic photodetector 122 which has a built-in operative amplifier 124. Optical band-pass filters 126-A and 126-B shield the light-sensitive area of photodetector 122. Filter 126-A transmits only UV-A radiation to photodetector 122, while filter 126-B allows only UV-B radiation to pass to the photodetector.

Photodetector 122 has an increased sensitivity in the UV-B and UV-A regions of the radiation spectrum and requires an applied voltage in the range of 2 to 4 volts. Such a photodetector is manufactured by UDT Sensors, Inc., 12525 Chadron Ave., Hawthorne, California. The built-in amplifier reduces the physical dimensions of the electronic circuit and increases the signal-to-noise ratio.

Assembly 116 is electronically connected to microcontroller 118 which includes a CPU (Central Processing Unit) 128, a driver unit 130, a memory 132 consisting of a Read-And-write Memory (RAM) 134 and a Read-Only Memory (ROM) 136, and a clock 138. The microcontroller is a logic circuit consisting of a plurality of transistors, resistors, and other electronic components in integrated circuit form. A sound-generating piezoelectric (PE) element 140 is electronically interconnected to microcontroller 118. LCD 104 and PE element 140 are controlled by driver 130.

RAM 134 contains user input data, such as skin protection factor, while ROM 136 is programmed with an algorithm for calculating the acceptable doses of UV radiation as well as with statistical data tabulating skin types, skin type changes, skin protection factors, UV radiation intensity levels, and threshold quantities of accumulated UV energy.

Microcontroller 118 is a CMOS (Complimentary Metal Oxide Semiconductor) structure and has terminals (not shown) which are connected to cells 112 and 114. A very low power consumption level, suitable for use with existing types of solar cells, is an inherent feature of a CMOS structure microcontroller.

Microcontroller 118 also includes terminals (not shown) for connection to LCD 104, information display key 106, skin-protection factor (SPF) input key 110, and skin-type input key 146.

FIGS 2 AND 3

OPERATION

Based on user input data, such as a type of skin and a skin protection factor, microcontroller 118 determines a UV radiation dose acceptable for a particular person.

Two criteria are used for determining such a dose. One of these is the amount of total accumulated UV energy, which is a time independent quantity determined for each type of skin on the basis of medical statistical data. When the total amount of UV energy accumulated by a subject's skin exceeds the statistically estimated value, any additional sun exposure of the subject may cause irreversible changes of the subject's skin structure, e.g., cancer.

The other criteria for determining an acceptable UV radiation dose is the intensity level of incident UV-A radiation. This criterion determines the daily UV radiation dose allowable for a subject, taking into account the subject's skin type, skin-type changes, and SPF.

To accurately monitor UV radiation levels, a subject must enter the data consisting of a subject's skin type and corresponding SPF using input keys 108 and 110.

When the noseshade is attached to a pair of sunglasses with clip 102, as shown in FIG. 2, switch 107 is automatically activated upon contact with the bridge of the sunglasses causing cells 112 and 114 to energize memory 132, clock 138, PE element 140, CPU 122, and driver 132. A user then enters his or her skin type by pressing key 108, while key 110 is used to enter SPF.

ROM 136 is programmed with an algorithm for calculating the acceptable doses of UV radiation. ROM 136 also contains medical data tabulating skin type, skin type changes, SPF, UV radiation intensity level, and total accumulated UV energy. RAM 134 contains skin-type and SPF data entered in by the user with switches 108 and 110, respectively.

Solar radiation incident onto optical filters 126-A and 126-B is captured by photodetector 122, which generates electrical signals having amplitudes proportional to incident UV-A and UV-B intensities. These signals are then amplified in amplifier 124 and are fed into microcontroller 128. The timing signal for the control functions of CPU 122 is provided by clock 138.

CPU 128 processes the input data from the photodetector assembly 116 together with the input data from RAM 134 (user input). Upon the comparison of the processed data to the tabulated data stored in ROM 136, CPU 128 calculates a UV radiation dose which is acceptable for a given person and sends an output to driver 130 if this dose has been exceeded. Driver 130 activates PE element 140, which appropriately issues an audible alarm.

CPU 128 causes PE element 140 to issue an audible alarm only when a daily threshold dose of UV radiation has been exceeded. Moreover, information concerning other UV radiation thresholds, such as the cumulative value of UV radiation, can be displayed on LCD 104 by pressing display key 106.

When the noseshade is placed in the shade and photodetector 122 does not register UV radiation, microcontroller 118 continues to provide output data based on the backup data stored in ROM 136. This backup data is based on the last signal received from photodetector 122.

SUMMARY, RAMIFICATIONS, AND SCOPE

Thus, it has been shown that I have provided an improved device for monitoring exposure to UV radiation. The device continues to monitor UV radiation when placed in the shade, issues an audible alarm when a predetermined UV radiation dose has been accumulated, takes into account the changes in skin pigmentation that occur during exposure to UV radiation, determines the acceptable UV radiation dose based on the intensity of incident radiation. Furthermore, the device protects a person's nose from sunburn. Moreover, the device is simple an convenient in operation, and is reliable and inexpensive.

Although the noseshade has been shown and described in the form of one specific embodiment, its parts, materials, and configurations are given only as examples, and many other modifications of the apparatus are possible. For example, solar cells 118 and 120 may be replaced with conventional dry cells. These dry cells may be of a rechargeable type, and additional photovoltaic cells may be included and used for the purpose of recharging the dry cells. Furthermore, two different photodetectors, specifically utilized for a UV-A and UV-B spectra, respectively, may be employed. Such a modification would effectively eliminate the need for optical band-pass filters. Portion 100 of the device may be flat and may attach to one of the temples of the sunglasses shown in FIG. 2. Therefore, the scope of the invention should be determined, not by the examples given, but by the appended claims and their legal equivalents.

What I claim is:

1. A noseshade for monitoring a subject's exposure to UV radiation, comprising:
   a contoured portion, having clip-on means for attaching said contoured portion to a pair of glasses; and
   a UV dosimeter incorporated into said contoured portion.

2. The noseshade of claim 1 wherein said UV dosimeter comprises:
   logic means for determining a threshold absorption dose of UV radiation;
   data-input means for entering data into said logic means, said data comprising said subject's skin type and skin protection factor;
   display means for displaying information, said information including a total UV energy dose accumulated by said subject and said subject's skin type rating;
   radiation-measuring means for measuring incident UV radiation and converting said radiation to electrical signals to be processed by said logic means;
   alarm means for issuing an audible signal indicating the accumulation of said threshold absorption dose of UV radiation;
   power-supply means for powering said logic means, said data-input means, said display means, said radiation-measuring means, and said alarm means; and
   circuit conductor means for electronically connecting said logic means, said data-input means, said display means, said radiation-measuring means, said power-supply means, and said alarm means.

3. The noseshade of claim 1 further including switching means for activating said UV dosimeter.

4. The noseshade of claim 3 wherein said switching means is a pressure-sensitive switch.

5. The noseshade of claim 2 wherein said logic means comprises a central processing unit, a read-only-memory, a read-and-write memory, a clock, and an electronic driver unit.

6. The noseshade of claim 2 wherein said alarm means includes a sound-generating piezoelectric element.

7. The noseshade of claim 2 wherein said data-input means comprises a plurality of switches.

8. The noseshade of claim 2 wherein said display means comprises a digital LCD.

9. The noseshade of claim 8 wherein said display means further includes pushbutton means for activating said digital LCD.

10. The noseshade of claim 2 wherein said radiation-measuring means comprises a dual UV-enhanced photovoltaic photodetector, a plurality of bandpass filters, and an operating amplifier, said plurality of bandpass filters being arranged to transmit only UV-A and UV-B ranges of incident solar radiation to said UV enhanced photovoltaic photodetector.

11. The noseshade of claim 2 wherein said power-supply means comprises a plurality of solar cells.

12. The noseshade of claim 2 wherein said logic means is a complimentary metal oxide semiconductor (CMOS) structure.

13. A noseshade for monitoring a subject's exposure to UV radiation, comprising:
   a contoured portion having clip-on means for attachment to a pair of glasses;
   a microcontroller including a central processing unit, a read-only memory, a read-and-write memory, a clock, and an electronic driver, said microcontroller being programmed to determine a threshold absorption dose of UV radiation, said microcontroller being incorporated into said contoured portion;
   a skin-type input switch and skin protection factor input switch, said switches being mounted into said contoured portion;
   a liquid-crystal display incorporated into said contoured portion, said digital LCD being able to display a total UV energy dose accumulated by said subject, said digital LCD also being able to display said subject's skin type;
   radiation-measuring means for measuring incident UV radiation and converting said radiation to electrical signals to be processed by said microcontroller;
   a plurality of solar cells having a pressure sensitive activation switch incorporated in said clip-on means;
   alarm means for issuing an audible signal indicating the attainment of said threshold absorption dose of UV radiation; and
   circuit conductor means for electronically connecting said microcontroller, said input switches, said digital LCD, said radiation-measuring means, an operational amplifier, said plurality of solar cells, and said alarm means.

14. The noseshade of claim 13 wherein said radiation-measuring means comprise a dual UV-enhanced photovoltaic photodetector, a plurality of bandpass filters, and an operational amplifier.

15. The noseshade of claim 14 wherein said plurality of bandpass filters comprises UV-A-type and UV-B-type filters.

16. The noseshade of claim 13 wherein said alarm means includes a sound-generating piezoelectric element.

17. The noseshade of claim 13 wherein said digital LCD further includes push-button means for activating said digital LCD.

18. The noseshade of claim 13 wherein said microcontroller is a complimentary metal oxide semiconductor (CMOS) structure.

* * * * *